W. MURPHY.
GRANITE MOLDING AND SURFACE CUTTING MACHINE.
APPLICATION FILED JAN. 2, 1908.
918,187.
Patented Apr. 13, 1909.
2 SHEETS—SHEET 2.
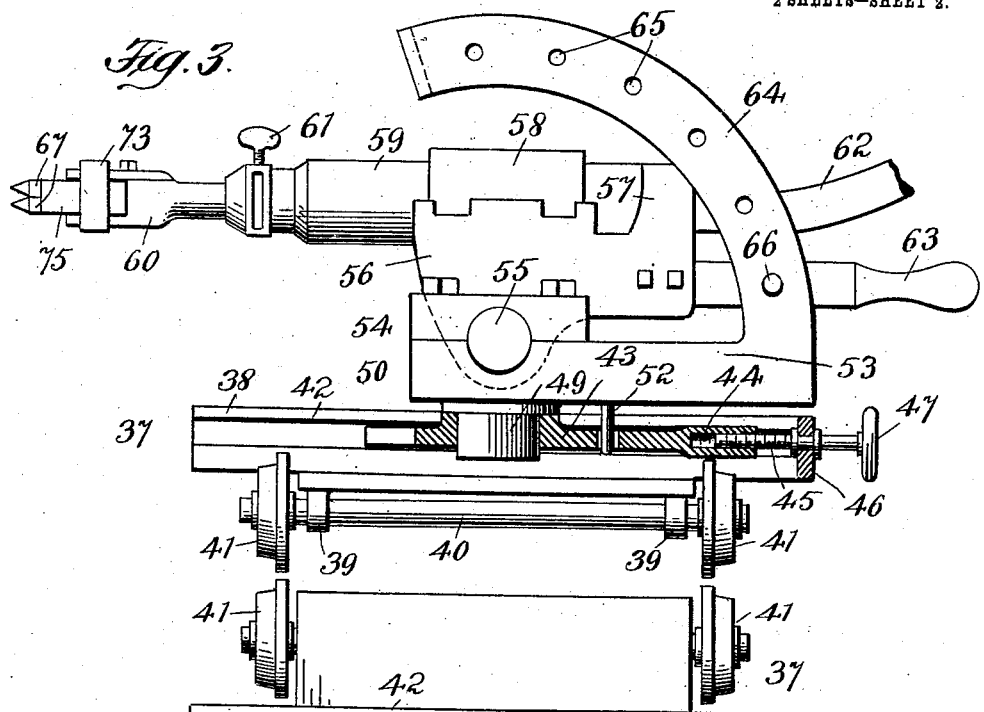
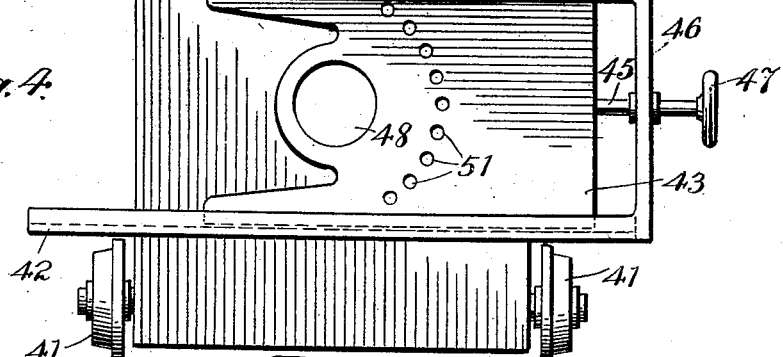
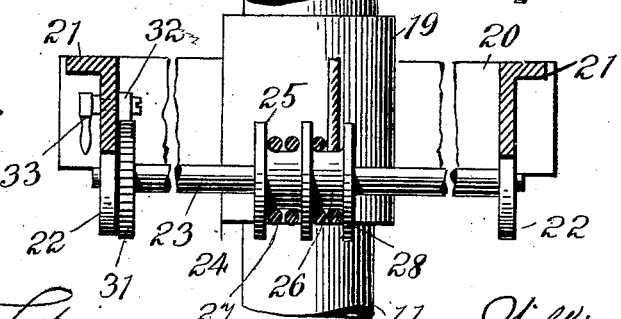

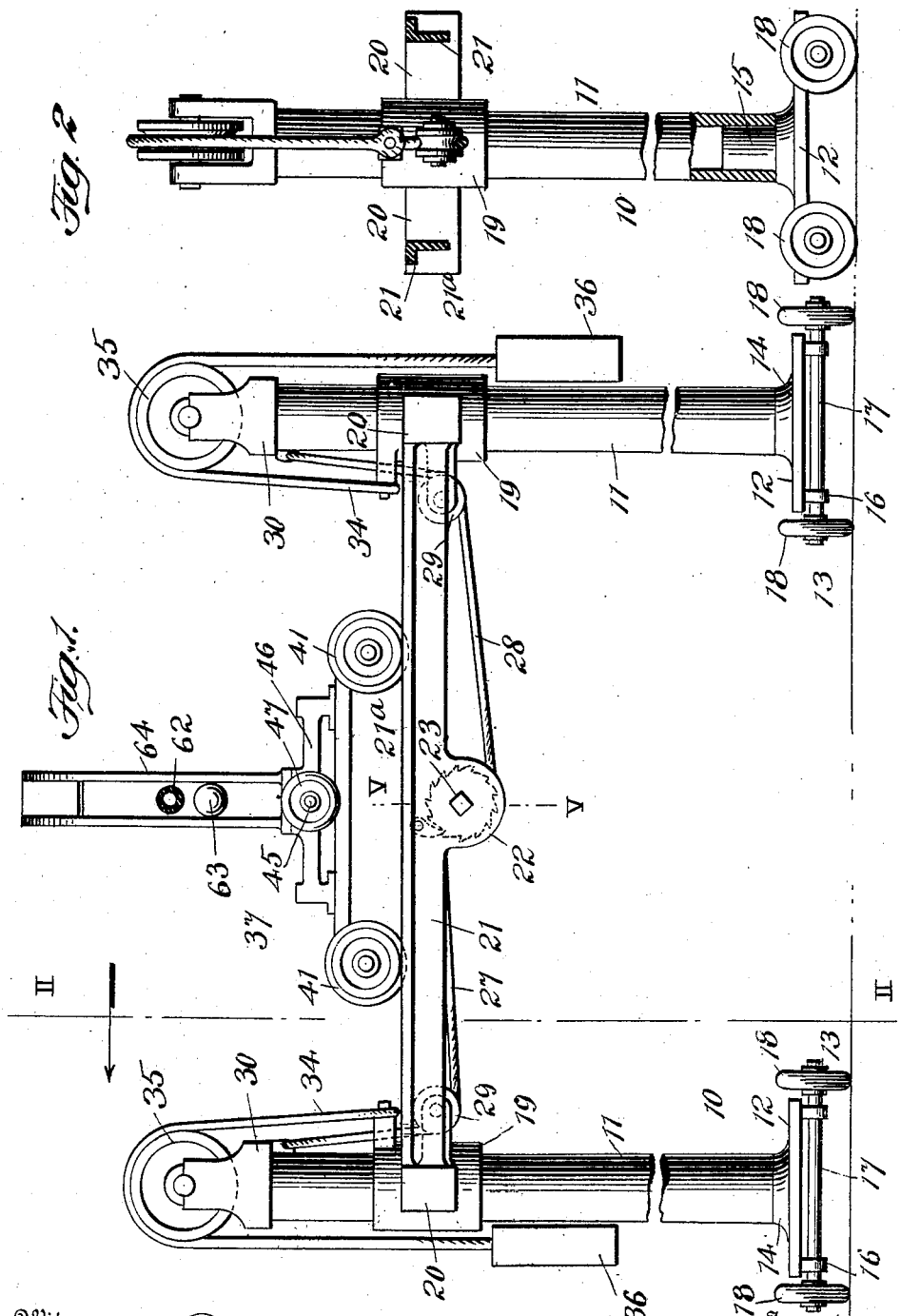

UNITED STATES PATENT OFFICE.

WILLIAM MURPHY, OF NEW YORK, N. Y., ASSIGNOR OF ONE-HALF TO JOHN P. GALLAGHER, OF BROOKLYN, N. Y.

GRANITE MOLDING AND SURFACE CUTTING MACHINE.

No. 918,187.  Specification of Letters Patent.  Patented April 13, 1909.

Application filed January 2, 1908. Serial No. 409,052.

*To all whom it may concern:*

Be it known that I, WILLIAM MURPHY, a citizen of the United States, and a resident of New York, borough of Brooklyn, county of Kings, and State of New York, have invented certain new and useful Improvements in Granite Molding and Surface Cutting Machines, of which the following is a full, clear, and exact description.

This invention relates more particularly to a cutting machine adapted to hold a pneumatic or other cutting tool.

The primary object of the invention is to provide a simple, effective and strong machine which is adapted to hold a pneumatic or other tool in such a way that any desired pressure may be applied to the tool, and the jar and force resulting from the action of the tool taken up entirely by the machine instead of the usual method of holding the tool in the hand, thereby permitting the material acted on by the tool to be cut more regularly and much quicker than is accomplished by the ordinary means employed for this purpose; and to provide a machine which may be quickly adjusted, so that the tool may be placed in any desired position, and at any desired angle, thus adapting the machine to secure better results, and to perform every movement that could be accomplished by holding the tool in the hand.

Another object of the invention is to provide a portable machine which may be readily shifted relatively to the work, and in which the tool is suitably held on a truck arranged to move along a track forming a part of a movable framework.

With these and other objects in view, the invention will be hereinafter more particularly described with reference to the accompanying drawings, which form a part of this specification, and will then be pointed out in the claims at the end of the description.

In the drawings, Figure 1 is a side elevation of one form of machine embodying my invention. Fig. 2 is a vertical section taken on the line II—II of Fig. 1. Fig. 3 is a detail elevation, partly in section, showing how the tool may be mounted so as to be adjustable at various angles upon a movable carriage. Fig. 4 is a detail plan with the tool and its carrying head removed; and Fig. 5 is an enlarged detail section taken on the line V—V of Fig. 1, showing a means for elevating and lowering the track along which the tool and its carriage travels.

The main frame 10 of the machine may be variously constructed, and may be made of any suitable material. As shown it comprises two uprights or standards 11, which may be hollow and of pipe, and each standard is mounted upon the platform 12 of a movable carriage or truck 13. The platform 12 is provided with a boss 14 from which projects a lug or spindle 15, Fig. 2, which is adapted to fit into the opening of the hollow standards 11, so as to form a pivot in order that the truck may swing at any desired angle, and extending from the platform 12 and beneath the same are the bearings 16 in which are journaled shafts 17 on the outer ends of which are suitable wheels 18. The standards 11 may be of any suitable height, and may be arranged any suitable distances apart, and when mounted on the trucks as shown, the frame may be readily moved or shifted to any desired position.

The standards 11 are each provided with a movable sleeve or member 19, which may be moved lengthwise thereof, and projecting outward from the sleeves 19 are the arms 20, which extend on opposite sides of the standards 11, and connecting said arms are the beams or track members 21 of a track 21ª. These track members may be angular or of any suitable form, and may each be provided with an enlarged portion 22 forming a bearing for a transverse shaft or spindle 23. Either or both ends of the shaft or spindle 23 may be made square or otherwise to adapt a wrench to be applied thereto, so that said spindle or shaft may be readily rotated, and on said shaft may be arranged a drum 24 having two members 25 and 26, to one of which is attached a cable or other flexible connection 27 and to the other a cable or flexible connection 28. These cables 27 and 28 pass around pulleys 29 mounted on the track beams 21, and are connected to brackets or cap-pieces 30 arranged on the upper end of the standards 11. These cables together with the drum and shaft connections permit the track and sleeves 19 to be readily adjusted vertically on the standards 11, and to hold the spindle against rotation a ratchet wheel 31 may be arranged on the shaft 23 and this ratchet wheel may be engaged by a pawl or dog 32. The dog 32 may be released when it is desired to lower the track and sleeves 19, and to accomplish this a handle 33 may be arranged to release the pawl. The weight of the track and sleeves may be counterbalanced, and to secure this a cable or other flexible connection 34 is connected at or near each sleeve 19, and each flexible connection passes over a pulley 35, which is held in one of the cap-pieces or brackets 30, and on the end of said cables or connections 34 may be arranged weights 36 so that the weight, as well as any weight that may be placed on the track may be compensated for.

To hold the tool in order that the same may be readily adjusted to any desired angle and to move said tool lengthwise of the main supporting frame 10, I arrange a carriage 37 to move along the track beams 21. This carriage has a platform 38, and arranged under the platform are bearings 39 in which the axles 40 are journaled, and on the end of said axles are the usual track wheels 41, which are adapted to have the flange thereof engage the inner surface of the angular track beams 21, and the tread of said wheels to rest upon the upper surface of said track beams, in order that the carriage may be properly guided on the track in such a way that the shock due to the impact of the tool in cutting will be conveyed to the main supporting frame. The platform 38 is provided with guides 42, and in said guides is adapted to move a slide or head 43. This slide 43 has a boss, which is provided with a screw-threaded opening 44, and this opening is engaged by the threaded end of a screw 45. The screw is held to rotate in the bar 46, and on the end of said screw is a wheel or other handle whereby the screw may be rotated, and the slide 43 moved in the guides 42. The slide 43 is provided with an opening 48, and in this opening is adapted to fit a projection or shaft 49, which is carried by a tool head 50, the said shaft or projection 49 being adapted to hold the head 50 so that the latter may be moved with the projection 49 as a pivot.

A series of apertures 51 are provided in the slide 43 in an arc concentric with the opening 48, and carried by the head 50 is a pin or bolt 52, which is adapted to be made to enter any one of the openings 51, thereby holding the head 50 at various angles with respect to the slide 43. This head 50 is provided with a horizontal portion 53, and in this portion are arranged suitable bearings 54, in which are held the trunnions 55 of a tool support 56. This tool support 56 may comprise a socket member 57 and a hinged member 58, which may be held to the member 56 so as to clamp the tool carrier or spindle 59 and hold the same therein in the usual manner, and in said tool spindle 59 is arranged a suitable tool 60. The tool 60 may be of any suitable form, and may be held to the spindle in any suitable way, and for this purpose a screw or device 61 may be made to engage the tool shank, so as to hold the same properly in the tool spindle. The tool spindle 59 may be so constructed that the tool 60 may be operated by pneumatic or other means, and said tool spindle may have the pneumatic tube 62 connected therewith as usual, so as to give the proper action to the cutting tool. The tool support 56 may be provided with a handle 63, which projects outwardly therefrom, and this handle is adapted to move between the members of a guide 64. This guide 64 is in the form of an arc with the trunnions 55 as a center, and in said guides are a number of openings or apertures 65 through which may be passed a pin or bolt 66, and through an opening in the handle 63, so that by removing the pin or bolt 66, the handle 63 may be raised or lowered, and thereby move the tool holder and support 56 on its trunnions 55, to place the tool at various angles in a vertical direction. By means of the trunnions 55 the tool 60 may be moved vertically at an angle, while the projection 49 will permit the tool to be moved or swung horizontally, and by means of the slide 43 the entire tool head may be moved horizontally and transversely of the platform of the carriage, and by having the carriage 37 mounted upon a track carried by the frame 10 and which may be vertically adjusted, it will be seen that almost every conceivable position of the tool may be secured.

From the foregoing it will be seen that simple and efficient means is provided whereby a pneumatic or other tool may be properly held in a head which is so arranged that said tool may be adjusted in any direction, and at any desired angle, and may be moved lengthwise or vertically of the work which is to be operated upon; that work ordinarily done by hand may be done much better, quicker, and more readily than can be done by hand; that moldings and other difficult work may be readily accomplished; and that the jar and impact of the tool is taken up more effectively without any strain whatever upon the operator as in the case where the tool is manually held.

Having thus described my invention, I claim as new and desire to secure by Letters Patent:—

1. In a cutting machine, the combination with a portable supporting frame, of a track vertically adjustable on said frame, a carriage adapted to move lengthwise of the track, a tool head mounted to swing at an angle on said carriage, tool-carrying means pivoted to the tool head, and means for adjusting the tool-carrying means.

2. In a cutting machine, the combination with a supporting frame, of a track vertically adjustable on said frame, and tool-carrying means adjustable both vertically and horizontally on said frame.

3. In a machine of the character described, the combination with supporting means, of a platform, a slide movably held on said platform, means for moving the slide, a tool head pivotally held to the slide, means for holding the tool head at different angles with respect to the slide, a tool support pivotally mounted in the tool head, and means for holding the tool support so as to be shifted vertically at various angles.

4. In a machine of the character described, the combination with vertically movable supporting means, of a platform movable lengthwise of said supporting means, a slide movably held on said platform, means for moving the slide, a tool head held to the slide, a tool support pivotally mounted in the tool head, and means for holding the tool support so as to be shifted vertically at various angles.

5. In a machine of the character described, the combination with supporting means, of a movable carriage having a platform, a slide movably held on said platform, means for moving the slide, a tool head pivotally held to the slide, means for holding the tool head at different angles with respect to the slide, a tool support pivotally mounted in the tool head, and means for adjusting the tool vertically at various angles.

6. In a machine of the character described, the combination with a supporting frame, of a movable carriage vertically adjustable on said frame and having a platform, a slide movably held on said platform, means for moving the slide, a tool head pivotally held to the slide, means for holding the tool head at different angles with respect to the slide, a tool support pivotally mounted in the tool head, and means for holding the tool support so as to be shifted vertically at various angles.

7. The combination with supporting means of a carriage movable along said supporting means and provided with suitable guides thereon, a slide held in the guides so as to move transversely of the carriage, a screw for moving the slide in the carriage, a tool head mounted upon the slide so as to swing horizontally thereon, means for adjustably holding the head to the slide, a tool support pivotally held to the tool head, means whereby the tool support may be moved vertically and held at various angles with respect to the movement of the tool head, and means carried by the tool support whereby the tool may be held to said support.

8. The combination with a portable supporting frame, of a carriage movable along and vertically on said frame and provided with suitable guides thereon, a slide movably held in the guides so as to move transversely of the carriage, a screw for moving the slide in the carriage, a tool head mounted upon the slide so as to swing horizontally thereon, means for adjustably holding the head to the slide, a tool support pivotally held to the tool head, means whereby the tool support may be moved vertically and held at various angles with respect to the movement of the tool head.

9. The combination with a supporting means, of means movable along said supporting means and provided with suitable guides thereon, a slide movably held in the guides so as to move transversely of the carriage, a screw for moving the slide in the carriage, a tool head mounted upon the slide so as to swing horizontally thereon, means for adjustably holding the head to the slide, a pneumatic tool support pivotally held to the tool head, means whereby the tool support may be moved and held at various angles with respect to the movement of the tool head, and means carried by the tool support whereby the tool may be held to said support.

10. The combination with supporting means including a slide, of a tool head mounted on the support so as to swing horizontally thereon, means for adjustably holding the head to the slide, a tool support pivotally held to the tool head, and a curved guide forming a part of the tool head and having means to hold the tool support at various angles with respect to the movement of the tool head.

11. In a machine of the character described, the combination with means for supporting and adjusting a cutting tool, of two standards forming a part of a supporting frame, sleeves adjustably held on said standards, a track comprising two beam members connecting the sleeves together so as to hold the standards apart, a pulley mounted on each standard, a flexible connection passing around each pulley and having a weight at one end and connected to one of the sleeves at the other end to counterbalance the track, and means for raising the track and sleeves on the standards.

12. In a machine of the character described, the combination with means for supporting and adjusting a cutting tool, of two standards forming a part of a supporting frame, sleeves adjustably held on said standards, a track comprising two beam members spaced apart and connecting the sleeves together so as to hold the standards apart, means for counterbalancing the track and means for raising the track and sleeves on the standards.

13. In a machine of the character described, the combination with two standards, of a truck for each standard, a sleeve adapted to slide on each standard, a track formed of two beams connecting the sleeves together, counterbalancing means for the track, together with means movable along the track for supporting a cutting tool.

This specification signed and witnessed this 26th day of December A. D. 1907.

WILLIAM MURPHY.

Witnesses:
M. TURNER,
H. LINEHAN.